(12) United States Patent
Tang

(10) Patent No.: US 11,768,496 B2
(45) Date of Patent: Sep. 26, 2023

(54) OBSTACLE-AVOIDANCE MOVING METHOD OF SELF-MOVING ROBOT

(71) Applicant: ECOVACS ROBOTICS CO., LTD., Suzhou (CN)

(72) Inventor: Jinju Tang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 101 days.

(21) Appl. No.: 17/393,082

(22) Filed: Aug. 3, 2021

(65) Prior Publication Data

US 2021/0365030 A1    Nov. 25, 2021

Related U.S. Application Data

(63) Continuation of application No. 16/275,216, filed on Feb. 13, 2019, now Pat. No. 11,112,800, which is a
(Continued)

(30) Foreign Application Priority Data

Apr. 14, 2014  (CN) .......................... 201410148490.X

(51) Int. Cl.
  *G05D 1/02*      (2020.01)
  *A47L 11/24*     (2006.01)
  *A47L 11/40*     (2006.01)

(52) U.S. Cl.
  CPC ............ *G05D 1/0214* (2013.01); *A47L 11/24* (2013.01); *A47L 11/4011* (2013.01);
(Continued)

(58) Field of Classification Search
  CPC .......................... G05D 1/0219; A47L 2201/04
  See application file for complete search history.

(56) References Cited

U.S. PATENT DOCUMENTS

| 5,353,224 A | 10/1994 | Lee et al. |
| 5,890,250 A | 4/1999  | Lange |
| (Continued) | | |

FOREIGN PATENT DOCUMENTS

| CN | 1365647 | 8/2003 |
| CN | 1463658 | 12/2003 |
| (Continued) | | |

OTHER PUBLICATIONS

Extended European Search Report and Written Opinion dated Dec. 1, 2017 in application PCT/CN2015/076510.
(Continued)

*Primary Examiner* — Ryan Rink
(74) *Attorney, Agent, or Firm* — Maschoff Brennan

(57) ABSTRACT

An obstacle avoidance moving method of a self-moving robot includes storing a coordinate of a first obstacle point and a coordinate of a second obstacle point. The coordinate of the first obstacle point and the coordinate of the second obstacle point are formed by detecting an obstacle by the self-moving robot when moving along a first direction. The method further includes performing a serpentine pattern moving according to the coordinate of the first obstacle point and the coordinate of the second obstacle point. The method accurately determines obstacle position and provides a concise moving path, and greatly improves the working efficiency of the self-moving robot.

9 Claims, 2 Drawing Sheets

Related U.S. Application Data continuation of application No. 15/304,039, filed as application No. PCT/CN2015/076510 on Apr. 14, 2015, now Pat. No. 10,248,126.

(52) U.S. Cl.
CPC ............ *A47L 11/4061* (2013.01); *G05D 1/02* (2013.01); *G05D 1/0219* (2013.01); *A47L 2201/04* (2013.01); *G05D 2201/0203* (2013.01); *Y10S 901/01* (2013.01)

(56) References Cited

U.S. PATENT DOCUMENTS

| | | |
|---|---|---|
| 6,574,536 B1 | 6/2003 | Kawagoe et al. |
| 6,615,108 B1 | 9/2003 | Peless et al. |
| 7,515,991 B2 | 4/2009 | Egawa et al. |
| 2005/0010331 A1 | 1/2005 | Taylor et al. |
| 2005/0251292 A1 | 11/2005 | Casey |
| 2005/0273967 A1 | 12/2005 | Taylor et al. |
| 2006/0080802 A1 | 4/2006 | Tani |
| 2008/0065347 A1 | 3/2008 | Lavarec et al. |
| 2008/0249661 A1 | 10/2008 | Hong |
| 2011/0167574 A1 | 7/2011 | Stout et al. |
| 2013/0060380 A1 | 3/2013 | Ryu |
| 2014/0121876 A1 | 8/2014 | Chen et al. |
| 2015/0150428 A1 | 6/2015 | Park et al. |
| 2017/0075353 A1 | 3/2017 | Tang |
| 2017/0156560 A1 | 6/2017 | Jung et al. |

FOREIGN PATENT DOCUMENTS

| | | |
|---|---|---|
| CN | 1535646 | 10/2004 |
| CN | 102541056 | 7/2012 |
| JP | 2005211367 | 8/2005 |
| WO | 0038025 | 6/2000 |
| WO | 2015158240 | 10/2015 |

OTHER PUBLICATIONS

International Search Report dated Jul. 10, 2015 in application PCT/CN2015/076510.

OBSTACLE-AVOIDANCE MOVING METHOD OF SELF-MOVING ROBOT

RELATED APPLICATION

The present application is a Continuation Application of the U.S. application Ser. No. 16/275,216, filed Feb. 13, 2019, which is a Continuation Application of the U.S. application Ser. No. 15/304,039, filed Nov. 28, 2016, which is the 371 National Stage of Application Number PCT/CN2015/076510, filed Apr. 14, 2015, claiming priority to Chinese Application Number 201410148490.X, filed Apr. 14, 2014 which are herein incorporated by reference in their entirety

TECHNICAL FIELD

The present disclosure relates to an obstacle-avoidance moving method of a self-moving robot, which belongs to the technical field of the manufacture of small household electric appliances.

BACKGROUND

The self-moving robot has been widely used for its convenient operation and freedom of movement, and has a variety of applications including window wiping, floor sweeping, air purification and so on. The self-moving robot sometimes runs into obstacle during its operation and can accurately and effectively avoid the obstacle during the self-moving moving process, hereby greatly improving the working efficiency. As an example of the glass-wiping robot, the prior art CN02137830.4 provides a method for identifying cleanable area and obstacle area for an automatic dust collector. FIG. 1 is a schematic diagram of the obstacle-avoidance moving of the existing self-moving robot. Referring to FIG. 1, if the movements of the self-moving robot are classified into movements in the horizontal direction (X axis) and in the vertical direction (Y axis), FIG. 1 is a schematic diagram of the traversing in the X-axis direction and obstacle-avoidance moving in the Y-axis direction of the self-moving robot. As shown in FIG. 1, the self-moving robot moves along the respective reciprocating paths of Y1, Y2 and Y3. When the self-moving robot runs into the obstacle A4, it bypasses the obstacle and moves in a reciprocating manner in the vertical direction, wherein the bypassing action is performed every time the self-moving robot runs into the obstacle A4 in the vertical direction. As a result of the moving mode of the existing self-moving robot, the moving on the path at the right side of the obstacle A4 is repeated for many times, which greatly prolongs the moving time and seriously impairs the working efficiency of the robot.

SUMMARY

In view of the above deficiencies in the prior art, the present disclosure provides an obstacle-avoidance moving method of a self-moving robot, which accurately determines obstacle position, provides a concise moving path, and greatly improves the working efficiency of the self-moving robot.

The above problems are solved by the following technical solutions according to the present disclosure.

An obstacle-avoidance moving method of a self-moving robot is provided, in a moving area of the self-moving robot, a rectangular plane coordinate system is established with the horizontal direction as the X axis and the vertical direction as the Y axis, characterized in that, the method specifically comprises the following steps:

step 100: the self-moving robot moves along the Y axis, when the self-moving robot moves forwardly along the Y axis and detects obstacle, it sets an obstacle point at the current position as an upside obstacle point and stores valid upside obstacle points as upside recorded points; when the self-moving robot moves reversely along the Y axis and detects obstacle, it sets an obstacle point at the current position as a downside obstacle point and stores valid downside obstacle points as downside recorded points;

step 200: according to storage sequence, the upside recorded points are classified into a current upside recorded point and previous upside recorded points, and the downside recorded points are classified into a current downside recorded point and previous downside recorded points;

step 300: if the current obstacle point is the upside obstacle point, it is determined whether there is before the current upside obstacle point a previous upside recorded point the Y-axis coordinate of which is less than that of the current upside obstacle point; and if the current obstacle point is the downside obstacle point, it is determined whether there is before the current downside obstacle point a previous downside recorded point, the Y-axis coordinate of which is larger than that of the current downside obstacle point;

step 400: if the determination result is positive, the previous upside recorded point or the previous downside recorded point is a turning point, the self-moving robot moves along the X axis from the current obstacle point toward the turning point to the X-axis coordinate of the turning point, deletes the coordinate of the turning point, and returns to the step 100 after completing serpentine pattern moving in an area between the turning point and the current obstacle point; and if the determination result is negative, the self-moving robot moves for a displacement M1 along the X axis;

step 500: the self-moving robot moves along a direction opposite to the former Y-axis moving direction, and returns to the step 100;

step 600: the step 100 to the step 500 are repeated until serpentine pattern moving in the moving area is completed.

The upside obstacle points and the downside obstacle points can be stored partially or wholly. Specifically, when the obstacle points are stored partially, the step 100 specifically further comprises:

if the Y-axis coordinate of the current upside obstacle point is different from that of each of the previous upside recorded points, the current upside obstacle point is the valid upside obstacle point; and if the Y-axis coordinate of the current downside obstacle point is different from that of each of the previous downside recorded points, the current downside obstacle point is the valid downside obstacle point.

When the obstacle points are stored wholly, the step 100 specifically further comprises: each of the upside obstacle points is the valid upside obstacle point; and each of the downside obstacle points is the valid downside obstacle point.

The step 400 specifically further comprises: if the determination result is positive, difference values of the X-axis coordinates of all of the upside recorded points or the downside recorded points that satisfy the determination condition from the X-axis coordinate of the current obstacle point are compared, and the upside recorded point or the downside recorded point having the largest difference value is taken as the turning point.

In order to reduce storage amount, the step 400 specifically further comprises: if the determination result is positive, the coordinates of all of the upside recorded points or the downside recorded points that satisfy the determination condition are deleted.

The step 400 specifically further comprises: if the self-moving robot detects obstacle again before reaching the X axis coordinate of the turning point, the coordinate of the turning point is deleted and the method proceeds to the step 500.

In the step 400, the self-moving robot performs serpentine pattern moving in the area between the turning point and the current obstacle point in the same moving mode as it completes serpentine pattern moving in the moving area in the step 600.

A step 410 is further comprised after the step 400: it is determined whether the self-moving robot can move along the former Y-axis moving direction, if the determination result is positive, the self-moving robot moves along the former Y-axis moving direction and returns to the step 100; and if the determination result is negative, the method proceeds to the step 500.

The determining of whether the self-moving robot can move along the former Y-axis moving direction in the step 400 specifically comprises:

the self-moving robot firstly moves along the former Y-axis moving direction, if the self-moving robot does not detect obstacle after moving for a certain distance, it is determined that the self-moving robot can move along the former Y-axis moving direction; otherwise, it is determined that the self-moving robot cannot move along the former Y-axis moving direction.

A side-looking sensor is provided on a side the self-moving robot, and the determining of whether the self-moving robot can move along the former Y-axis moving direction in the step 400 specifically comprising: according to a feedback signal of the side-looking sensor, the self-moving robot determines whether it can move along the former Y-axis moving direction.

The present disclosure further provides obstacle-avoidance moving method of a self-moving robot, in a moving area of the self-moving robot, a rectangular plane coordinate system is established with the horizontal direction as the X axis and the vertical direction as the Y axis, and moving along the direction of the X axis or the Y axis is a forward moving;

the method specifically comprises the following steps:

step 1000: the self-moving robot moves along the Y axis, when the self-moving robot detects obstacle, the current position is set as an obstacle point and the coordinate of the current position is stored as a recorded point;

step 2000: it is determined whether a recorded point, the Y-axis coordinate of which is within a numerical interval defined by the Y-axis coordinates of the current obstacle point and the previous obstacle point, has been stored previously;

step 3000: if the determination result is positive, the recorded point is a turning point, and the self-moving robot moves along the X axis from the current obstacle point toward the turning point to the X-axis coordinate of the turning point, deletes the coordinate of the turning point, and the method returns to the step 1000 after performing serpentine pattern moving in an area between the turning point and the current obstacle point; and if the determination result is negative, the self-moving robot shifts for a displacement M1 along the X axis;

step 4000: the self-moving robot moves along a reverse direction opposite to the former Y-axis moving direction, and the method returns to the step 1000;

step 5000: the step 1000 to the step 4000 are repeated until Y-axis serpentine pattern moving in the moving area is completed.

In conclusion, the advantage of the present disclosure lies in that when the self-moving robot runs into obstacle during its moving process, it can perform an one-off avoidance action with respect to obstacle by the coordinate determination so as to complete the working in each area between the periphery of the obstacle and the boundaries of the moving area; whereas in the prior art, the self-moving robot has to move around the obstacle while avoiding obstacle for many times during its working process. Thus, the present disclosure accurately determines obstacle position and provides a concise moving path, and thus greatly improves the working efficiency of the self-moving robot.

Hereinafter, the technical solutions of the present disclosure will be described in detailed in combination with the drawings and the specific embodiments.

DETAILED DESCRIPTION OF EXAMPLE EMBODIMENTS

The First Embodiment

Figure 2:
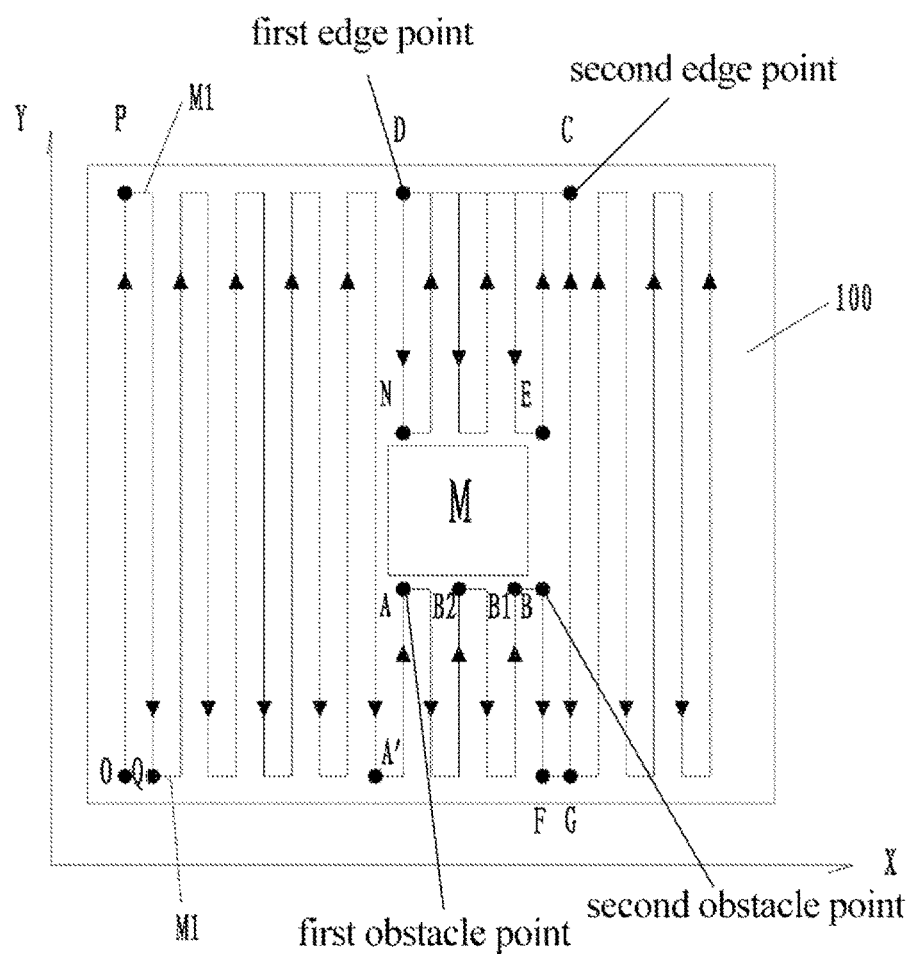
FIG. 2 is a schematic diagram of an obstacle-avoidance moving of a self-moving robot according to the first embodiment of the present disclosure.

FIG. 2 is a schematic diagram of an obstacle-avoidance moving of a self-moving robot according to the first embodiment of the present disclosure. As shown in FIG. 2, the specific obstacle-avoidance moving process according to the present disclosure is described as follow. Firstly, in the moving area of the self-moving robot, a rectangular plane coordinate system is established with the horizontal direction as the X axis and the vertical direction as the Y axis, and the moving along the direction of the X axis or Y axis is a forward moving, and otherwise, a reverse moving.

Referring to FIG. 2, in the present embodiment, the obstacle-avoidance moving process according to the present disclosure is described merely by the example in which the self-moving robot moves along the Y axis. To be specific, in the moving area 100, the self-moving robot moves upward forwardly along the Y axis from the point O at the lower left corner of the moving area, and detects obstacle, which may be a frame or a frameless suspending edge and so on of the moving area 100, when it moves and reaches the point P on the upper edge of the moving area 100. At this time, the coordinate of this point is stored as $(X_O, Y_P)$. The self-moving robot moves downward reversely along the Y axis after shifting for a displacement M1 along the direction of the X axis. The self-moving robot detects obstacle when it moves and reaches the point Q on the lower edge of the moving area 100. At this time, the coordinate of this point is stored as $(X_Q, Y_Q)$. The self-moving robot performs an automatic detection for determining whether there is a recorded point, the Y-axis coordinate of which is within a Y-axis coordinate interval $(Y_Q, Y_P)$ defined by the current coordinate point Q and the previous coordinate point P that have been stored. As shown in FIG. 2, obviously, there is no such recorded point. Accordingly, the self-moving robot moves upward forwardly along the Y axis again after shifting from the point Q for the displacement M1 along the direction of the X axis. In this way, the self-moving robot moves along a reciprocating "弓"-shaped path, and meanwhile stores the coordinate of each point at which obstacle is detected and determines whether there is a recorded point having a Y-axis coordinate within the Y-axis coordinate interval defined by the current coordinate point and the previous coordinate point that have been stored. The self-moving robot detects obstacle when it moves and reaches the point A, and stores the coordinate of this point as $(X_A, Y_A)$. Since the coordinate of the obstacle point A' previous to the point A is $(X_A, Y_Q)$, and there is no recorded obstacle point having a Y-axis coordinate between $Y_A$ and $Y_Q$, the self-moving robot moves downward along the Y axis after shifting from the point A for the displacement M1 along the direction of the X axis. In this way, the self-moving robot moves along a reciprocating "弓"-shaped path, and meanwhile stores each coordinate point at which obstacle is detected. Then, the self-moving robot moves and reaches the point C, which has the coordinate $(X_C, Y_P)$, and the obstacle-detected point previous to which is the point F having the coordinate $(X_B, Y_Q)$. Obviously, the Y-axis coordinate of each of the points A, B1 and B2 among the recorded points that have been stored is between the Y-axis coordinates of the point C and the point F, and the X-axis coordinate $X_A$ of the point A is less than the X-axis coordinate $X_B$ of the point B. In this situation, the point A is a turning point. The self-moving robot moves reversely along the X axis from the point C to the point D which has the same X-axis coordinate as the point A. At this time, in order to prevent the self-moving robot from retuning again and repeatedly moving, the points A and B and the recorded points that have the same Y-axis coordinate as the points A and B are deleted. Serpentine pattern moving in the area between the point D and the point C is started, during which even when the self-moving robot detects obstacle, it does not store any coordinate point until it moves and reaches the X-axis coordinate of the point C again. Hereafter, the self-moving robot resumes storing the coordinate points at which obstacle is detected, and thus returns to the routine reciprocating "弓"-shaped moving mode. In the present embodiment, the moving mode applied during serpentine pattern moving process in the obstacle area between the point D and the point C is also the reciprocating "弓"-shaped moving mode. It should be noted that the moving mode here is not limited to the reciprocating "弓"-shaped moving mode, and the use of other moving modes such as "回"-shaped moving mode can also achieve the same technical effect. As shown in FIG. 2, the moving path of the self-moving robot is: O→P→Q→A→B→F→G→D→N→E→C→G.

That is to say, in the first embodiment, the coordinates of the obstacle points are stored as the recorded points. During the movement of the self-moving robot, it is determined whether there is a recorded point, the Y-axis coordinate of which is within the Y-axis coordinate interval defined by the Y-axis coordinates of the current obstacle point and the previous obstacle point. If the determination result is positive, this recorded point is the turning point. The self-moving robot moves to the turning point from the current obstacle point. If there are multiple recorded points that satisfy the above determination condition, differences of the X-axis coordinates of all recorded points that satisfy the determination condition from the X-axis coordinate of the current obstacle point are compared, and the recorded point having the largest difference is the turning point. If the determination result is negative, the self-moving robot moves reversely along the Y axis after shifting from the current obstacle point for the displacement M1 along the X axis, and returns to the routine reciprocating "弓"-shaped moving mode.

In conclusion, in the obstacle-avoidance moving method of the self-moving robot according to the present disclosure, in the moving area of the self-moving robot, a rectangular plane coordinate system is established with the horizontal direction as the X axis and the vertical direction as the Y axis, and the moving along the direction of the X axis or Y axis is a forward moving.

The method specifically comprises the following steps:

step 1000: the self-moving robot moves along the Y axis, when the self-moving robot detects obstacle, the current position is set as an obstacle point and the coordinate of the current position is stored as a recorded point;

step 2000: it is determined whether a recorded point, the Y-axis coordinate of which is within a numerical interval defined by the Y-axis coordinates of the current obstacle point and the previous obstacle point, has been stored previously;

step 3000: if the determination result is positive, the recorded point is a turning point, and the self-moving robot moves along the X axis from the current obstacle point toward the turning point to the X-axis coordinate of the turning point, deletes the coordinate of the turning point, and the method returns to the step 1000 after performing serpentine pattern moving in an area between the turning point and the current obstacle point; and if the determination result is negative, the self-moving robot shifts for a displacement M1 along the X axis;

step 4000: the self-moving robot moves along a reverse direction opposite to the former Y-axis moving direction, and the method returns to the step 1000;

step 5000: the step 1000 to the step 4000 are repeated until Y-axis serpentine pattern moving in the moving area is completed.

The Second Embodiment

Figure 3:
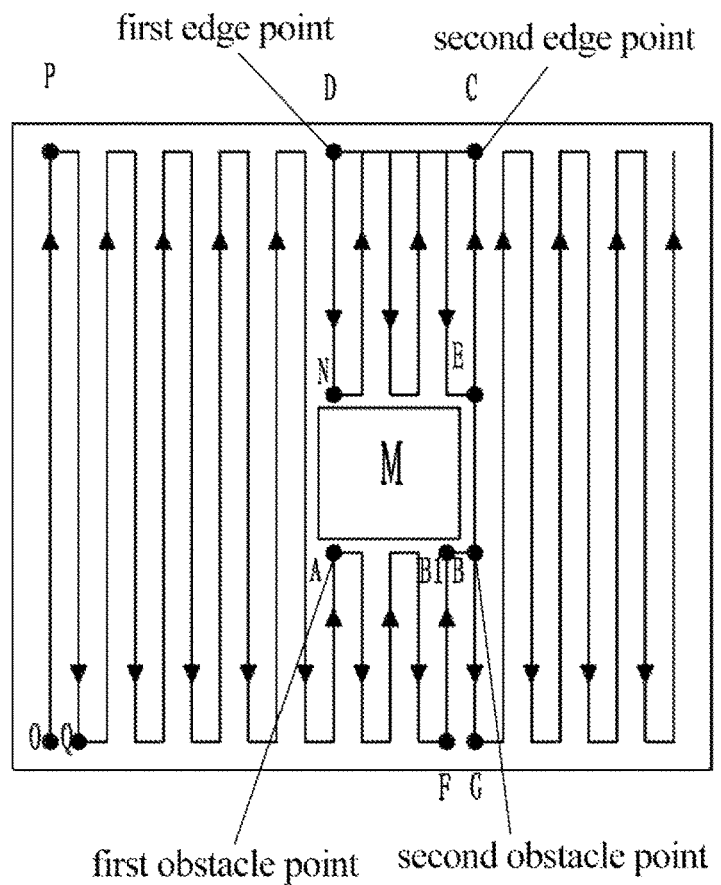
FIG. 3 is a schematic diagram of the obstacle-avoidance moving of a self-moving robot according to the second embodiment of the present disclosure.

FIG. 3 is a schematic program of an obstacle-avoidance moving of a self-moving robot according to the second embodiment of the present disclosure. As shown in FIG. 3, it is also required in the second embodiment that a rectangular plane coordinate system is established with the horizontal direction as the X axis and the vertical direction as the Y axis, and the moving along the direction of the X axis or Y axis is set as a forward moving; otherwise, a reverse moving. Meanwhile, the coordinate of a point at which the robot runs into obstacle when moving forwardly along the Y axis is set as the coordinate of an upside obstacle point, and the coordinate of a point at which the self-moving robot runs into obstacle when moving reversely along the Y axis is set as the coordinate of a downside obstacle point. Similarly, a coordinate of a point at which the self-moving robot runs into obstacle when moving forwardly along the X axis is set as the coordinate of a right side obstacle point, and a coordinate of a point at which the self-moving robot runs into obstacle when moving reversely along the X axis is set as the coordinate of a left side obstacle point.

The self-moving robot stores the coordinates of the upside obstacle points and the downside obstacle points respectively, and among the upside obstacle points or the downside obstacle points, the points which have the same Y-axis coordinate are stored for one time with respect to only one thereof. Specifically, referring to FIG. 3, when the self-moving robot moves and reaches the point P, it detects the upside obstacle point P which has the coordinate $(X_O, Y_P)$. Since there is previous to the point P no upside recorded point having the same Y-axis coordinate as the point P, the point P is a valid upside obstacle point, and the coordinate of the point P is stored as an upside recorded point. Further, since all upside obstacle points in the moving area between the point P and the point A have the same Y-axis coordinate as the point P, these upside obstacle points in this area are invalid upside obstacle points, and the coordinates of them are not stored. Similarly, among the downside obstacle points in this area, only the coordinate $(X_Q, Y_Q)$ of the downside obstacle point Q is stored. When the self-moving robot moves forwardly along the Y axis and runs into obstacle at the point A, it compares the coordinate $(X_A, Y_A)$ of the point A with that of the stored upside recorded points. The point P is the only one upside recorded point that has been stored so far. Since the Y-axis coordinate $Y_A$ of the point A is not equal to the Y-axis coordinate $Y_P$ of the point P, the coordinate $(X_A, Y_A)$ of the upside obstacle point A is stored as the upside recorded point. Furthermore, since the coordinate $Y_A$ is less than the coordinate $Y_P$, the self-moving robot shifts for a displacement M1 along the X axis, and then determines whether the self-moving robot can continue to move along the former moving direction prior to the shifting. Here, the former direction is the forward direction of the Y axis. If the determination result is positive, the self-moving robot continues to move forwardly along the Y axis; and if the determination result is negative, the self-moving robot moves reversely along the Y axis. At this time, obviously, the self-moving robot cannot move forwardly along the Y axis, and thus, the self-moving robot moves reversely along the Y axis, i.e., moving downward along the Y axis. In the moving area between the point A and the point B1, all the upside obstacle points have the same Y-axis coordinate as the point A, and thus, the coordinates of these upside obstacle points in this area are not stored. The self-moving robot detects obstacle when it moves and reaches the point B1, and also compares the coordinate of the point B1 with those of the previously stored upside recorded points. Since the Y-axis coordinates of the point P and the point A are larger than or equal to that of the point B1, the self-moving robot moves and reaches the point B after shifting from the point B1 for the displacement M1 along the X axis. At this time, at the point B, it is necessary for the self-moving robot to determine whether it can continue to move upward along the former Y-axis moving direction. Obviously, the self-moving robot can move upward along the previous Y-axis moving direction at this time, and thus continues to move and reaches the point C. When the self-moving robot moves and reaches the point C, it compares the Y axis coordinate of the point C with those of the previously stored points P and A. Obviously, the Y axis coordinate of the point A is less than that of the point C. While designating the point A as a turning point, the self-moving robot moves along the X axis from the point C to the point D which has the same X axis coordinate as the point A, and then moves along the Y axis. At this time, the recorded point A is deleted. Thereafter, the self-moving robot moves from the point D to the point E along the reciprocating "弓"-shaped path, during which the self-moving robot does not store any coordinate point even when it detects obstacle. After the self-moving robot moves and reaches the point E (not including the time of reaching the point E), it resumes storing valid obstacle points. At this time, as doing at the point B described above, the self-moving robot has to determine whether it can continue to move downward along the former Y-axis moving direction. If the determination result is positive, the self-moving robot continues to move from the point E to the point G; and if the determination result is negative, the self-moving robot moves upward along the Y axis (not shown). Thereafter, starting from the point G, the self-moving robot resumes the routine reciprocating "弓"-shaped moving mode. As shown in FIG. 3, the moving path of the self-moving robot is: O→P→Q→A→B→C→D→N→E→G.

Compared with the first embodiment, the second embodiment has the following two differences. First, the concepts of "upside" and "downside" are defined with respect to the moving directions of the self-moving robot along the Y axis. When the self-moving robot moves forwardly along the Y axis, it is not necessary to store the coordinate of each of the obstacle points having the same Y axis coordinate, but just store the obstacle points having distinct Y-axis coordinates as the recorded points. During the movement process of the self-moving robot, it is only required to determine whether there is among the previously stored upside recorded points a recorded point which has a less Y axis coordinate than the current obstacle point. If the determination result is positive, the self-moving robot moves back to the X axis coordinate of this recorded point from the current obstacle point; and if the determination result is negative, the self-moving robot shifts from the current obstacle point for the displacement M1 along the X axis. Second, after the self-moving robot detects obstacle and shifts for the displacement M1, there is added the determination of whether the self-moving robot can continue to move along the moving direction prior to the shifting. If the determination result is positive, the self-moving robot continues to move along the moving direction prior to the shifting; and if the determination result is negative, the self-moving robot moves along a direction opposite to the moving direction prior to the shifting. In the present embodiment, due to the addition of such determination step, it is possible to further simplify the moving path and improve the working efficiency of the self-moving robot.

It should be noted that although in the present embodiment, the concepts of "upside" and "downside" are defined with respect to the moving directions of the self-moving robot along the Y axis, and the obstacle points having the same Y axis coordinate in the upside or downside obstacle points are stored for one time with respect to only one thereof in order to reduce data storage, if the coordinates of all these obstacle points are stored, the moving path shown in FIG. 3 can also be achieved. Further, in the present embodiment, in order to optimize the moving path, after detecting obstacle and then shifting for the displacement M1, the self-moving robot moves along the same moving direction as prior to the shifting preferentially. However, the obstacle-avoidance moving method in the present embodiment is not limited to this limiting condition. For example, with the removal of the limiting condition, the self-moving robot moves along the reciprocating "弓"-shaped path all the time, and can achieve the moving path as shown in FIG. 2.

The Third Embodiment

Figure 4:
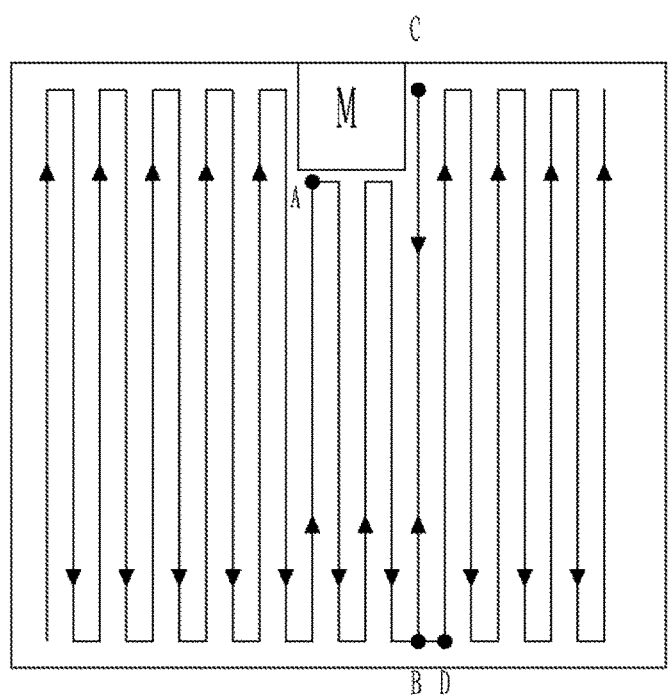
FIG. 4 is a schematic diagram of an obstacle-avoidance moving of a self-moving robot according to the third embodiment of the present disclosure.

FIG. 4 is a schematic program of an obstacle-avoidance moving of a self-moving robot according to the third embodiment of the present disclosure. As shown in FIG. 4, the present embodiment provides a further optimization based on the foregoing two embodiments. The self-moving robot stores the coordinate of the point A after it runs into obstacle at the point A, and then runs into obstacle again after it moves and reaches the point C. The Y-axis coordinate of the point A is less than that of the point C. According to the previous control method, the point A should be a turning point, and the self-moving robot should move along the X axis from the point C to the position which has the same X axis coordinate as the point A. However, the self-moving robot detects blockage of obstacle M. At this time, the coordinate of the turning point A is deleted, and the self-moving robot moves downward from the point C to the point B along the Y axis, and moves and reaches the point D after shifting from the point B for the displacement M1 along the X axis. Thereafter, starting from the point D, the self-moving robot resumes the routine reciprocating "弓"-shaped moving mode. As shown in FIG. 4, the moving path of the self-moving robot is: A→B→C→B→D.

The third embodiment further adds the following step to improve the control methods provided in the first and second embodiments: in the moving process along the direction of the X or Y axis, the self-moving robot further performs determination and control when it is required to change direction according to the control methods but detects obstacle.

In the above three embodiments, the obstacle-avoidance methods of the self-moving robot moving only along the Y axis are described. Obviously, the above-mentioned methods are also applicable when the self-moving robot moves along the X axis. Furthermore, for sake of explanation of the moving path, the rectangular plane coordinate system is established with the horizontal direction as the X axis and the vertical direction as the Y axis. However, the present disclosure is not limited to the horizontal direction and the vertical direction, and other two directions such as an east-west direction and a south-north direction that are perpendicular to one another are also be applicable to establish the coordinate system.

In conclusion, the present disclosure provides an obstacle-avoidance moving method of a self-moving robot, in which in a moving area of the self-moving robot, a rectangular plane coordinate system is established with the horizontal direction as the X axis and the vertical direction as the Y axis, and the method specifically comprises the following steps:

step 100: the self-moving robot moves along the Y axis, when the self-moving robot moves forwardly along the Y axis and detects obstacle, it sets an obstacle point at the current position as an upside obstacle point and stores valid upside obstacle points as upside recorded points; when the self-moving robot moves reversely along the Y axis and detects obstacle, it sets an obstacle point at the current position as a downside obstacle point and stores valid downside obstacle points as downside recorded points;

step 200: according to storage sequence, the upside recorded points are classified into a current upside recorded point and previous upside recorded points, and the downside recorded points are classified into a current downside recorded point and previous downside recorded points;

step 300: if the current obstacle point is the upside obstacle point, it is determined whether there is before the current upside obstacle point a previous upside recorded point, the Y-axis coordinate of which is less than that of the current upside obstacle point; and if the current obstacle point is the downside obstacle point, it is determined whether there is before the current downside obstacle point a previous downside recorded point the Y-axis coordinate of which is larger than that of the current downside obstacle point;

step 400: if the determination result is positive, the previous upside recorded point or the previous downside recorded point is a turning point, the self-moving robot moves along the X axis from the current obstacle point toward the turning point to the X-axis coordinate of the turning point, deletes the coordinate of the turning point, and returns to the step 100 after completing serpentine pattern moving in an area between the turning point and the current obstacle point; and if the determination result is negative, the self-moving robot moves for a displacement M1 along the X axis;

step 500: the self-moving robot moves along a direction opposite to the former Y-axis moving direction, and returns to the step 100;

step 600: the step 100 to the step 500 are repeated until serpentine pattern moving in the moving area is completed.

The step 100 specifically further comprises:

if the Y-axis coordinate of the current upside obstacle point is different from that of each of the previous upside recorded points, the current upside obstacle point is the valid upside obstacle point; and if the Y-axis coordinate of the current downside obstacle point is different from that of each of the previous downside recorded points, the current downside obstacle point is the valid downside obstacle point.

Alternatively, the step 100 specifically further comprises:

each of the upside obstacle points is the valid upside obstacle point; and each of the downside obstacle points is the valid downside obstacle point.

The step 400 specifically further comprises: if the determination result is positive, difference values of the X-axis coordinates of all of the upside recorded points or the downside recorded points that satisfy the determination condition from the X-axis coordinate of the current obstacle point are compared, and the upside recorded point or the downside recorded point having the largest difference value is taken as the turning point.

The step 400 specifically further comprises: if the determination result is positive, the coordinates of all of the upside recorded points or the downside recorded points that satisfy the determination condition are deleted.

The step 400 specifically further comprises: if the self-moving robot detects obstacle again before reaching the X axis coordinate of the turning point, the coordinate of the turning point is deleted and the method proceeds to the step 500.

In the step 400, the self-moving robot performs serpentine pattern moving in the area between the turning point and the current obstacle point in the same moving mode as it completes serpentine pattern moving in the moving area in the step 600.

A step 410 is further comprised after the step 400: it is determined whether the self-moving robot can move along the former Y-axis moving direction, if the determination result is positive, the self-moving robot moves along the former Y-axis moving direction and returns to the step 100; and if the determination result is negative, the method proceeds to the step 500.

The determining of whether the self-moving robot can move along the former Y-axis moving direction in the step 400 specifically comprising:

the self-moving robot firstly moves along the former Y-axis moving direction, if the self-moving robot does not detect obstacle after moving for a certain distance, it is determined that the self-moving robot can move along the former Y-axis moving direction; otherwise, it is determined that the self-moving robot cannot move along the former Y-axis moving direction.

A side-looking sensor is provided on the side the self-moving robot, and the determining of whether the self-moving robot can move along the former Y-axis moving direction in the step 400 specifically comprising: according to a feedback signal of the side-looking sensor, the self-moving robot determines whether it can move along the former Y-axis moving direction.

Figure 1:
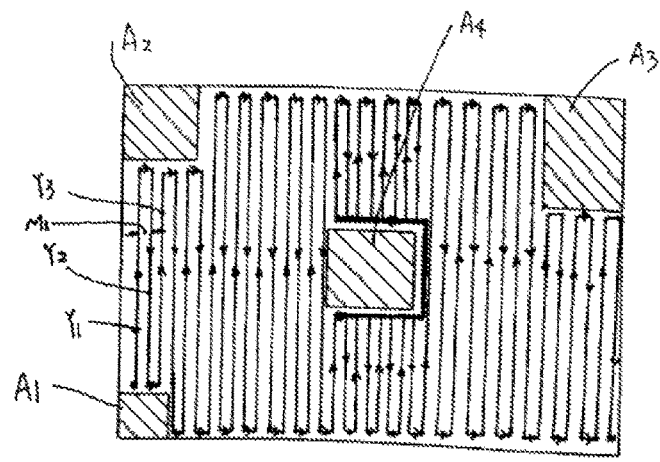
FIG. 1 is a schematic diagram of an obstacle-avoidance moving of the existing self-moving robot.

As can be known from the comparison of FIG. 1 with FIGS. 2-4, the advantage of the present disclosure lies in that when the self-moving robot runs into obstacle during its moving process, it can perform an one-off avoidance action with respect to obstacle by the coordinate determination so as to complete the working in each area between the periphery of the obstacle and the boundaries of the moving area; whereas in the prior art, the self-moving robot has to move around the obstacle while avoiding obstacle for many times during its working process. Thus, the present disclosure accurately determines obstacle position and provides a concise moving path, and thus greatly improves the working efficiency of the self-moving robot.

What is claimed is:

1. An obstacle avoidance moving method of a self-moving robot, comprising:

obtaining a coordinate of a first obstacle point, wherein, the first obstacle point is a point where the self-moving robot firstly reaches an obstacle during the self-moving robot preforming a serpentine pattern moving in a moving area reciprocated along a first direction;

performing the serpentine pattern moving from the coordinate of the first obstacle point reciprocated along the first direction;

obtaining a coordinate of a second obstacle point, wherein the second obstacle point is a point where the self-moving robot leaves the obstacle;

obtaining a coordinate of a first edge point and a coordinate of a second edge point, wherein the second edge point is a point where the self-moving robot firstly reaches one edge of the moving area after leaving the coordinate of the second obstacle point, the first edge point is a point located at the same edge as the second edge point, and the first edge point has a same abscissa or ordinate with the coordinate of the first obstacle point;

moving directly from the coordinate of the second edge point to the coordinate of the first edge point along a second direction after the coordinate of the second edge point is reached, wherein the second direction is parallel to the first direction and in an opposite direction with regard to the first direction; and performing the serpentine pattern moving from the coordinate of the first edge point reciprocated along the first direction.

2. The obstacle avoidance moving method of the self-moving robot of claim 1, wherein, the first obstacle point is determined when a current moving distance is less than a moving distance previous to the current moving distance, and the second obstacle point is determined when a current moving distance is larger than a moving distance previous to the current moving distance; and wherein the moving distance is a distance along a third direction when reaching an obstacle, and the third is perpendicular to the first distance.

3. The obstacle avoidance moving method of the self-moving robot of claim 1, wherein, the serpentine pattern moving comprises:

when an obstacle is detected, rotating a first degree and moving a preset distance; and when the preset distance is moved, rotating the first degree and moving along the first direction.

4. The obstacle avoidance moving method of the self-moving robot of claim 3, wherein, the first degree comprises one of:

90 degree and −90 degree.

5. An obstacle avoidance moving method of a self-moving robot, comprising:

obtaining a coordinate of a first edge point and a coordinate of a second edge point, wherein the first edge point and the second edge point are points located at one edge of a moving area, and the first edge point and the second edge point correspond respectively to two opposite edges of an obstacle detected by the self-moving robot when performing a serpentine pattern moving to the moving area, and wherein the serpentine pattern moving is reciprocated along a first direction;

moving directly from the coordinate of the second edge point to the coordinate of the first edge point along a second direction, wherein the second direction is parallel to the first direction and in an opposite direction with regard to the first direction; and performing the serpentine pattern moving from the coordinate of the first edge point.

6. The obstacle avoidance moving method of the self-moving robot of claim 5, wherein, the obstacle comprises a first edge having a first horizontal coordinate and a second edge having a second horizontal coordinate;

and wherein, a horizontal coordinate of the coordinate of the first edge point is same to the first horizontal coordinate, and a horizontal coordinate of the coordinate of the second edge point is same to the second horizontal coordinate.

7. The obstacle avoidance moving method of the self-moving robot of claim 5, wherein, the obstacle comprises a first edge having a first vertical coordinate and a second edge having a second vertical coordinate;

and wherein, a vertical coordinate of the coordinate of the first edge point is same to the first vertical coordinate, and a vertical coordinate of the coordinate of the second edge point is same to the second vertical coordinate.

8. The obstacle avoidance moving method of the self-moving robot of claim 5, wherein, the serpentine pattern moving comprises:

when an obstacle is detected, rotating a first degree and moving a preset distance; and when the preset distance is moved, rotating the first degree and moving along the first direction.

9. The obstacle avoidance moving method of the self-moving robot of claim 8, wherein, the first degree comprises one of:

90 degree and −90 degree.

* * * * *